(12) United States Patent
Ito

(10) Patent No.: US 11,904,862 B2
(45) Date of Patent: Feb. 20, 2024

(54) AUTOMATED DRIVING SYSTEM

(71) Applicant: TOYOTA JIDOSHA KABUSHIKI KAISHA, Toyota (JP)

(72) Inventor: Hironori Ito, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 307 days.

(21) Appl. No.: 17/500,649

(22) Filed: Oct. 13, 2021

(65) Prior Publication Data
US 2022/0118982 A1   Apr. 21, 2022

(30) Foreign Application Priority Data
Oct. 20, 2020   (JP) .................. 2020-176318

(51) Int. Cl.
B60W 30/18   (2012.01)
B60K 35/00   (2006.01)
(Continued)

(52) U.S. Cl.
CPC ....... B60W 30/18163 (2013.01); B60K 35/00 (2013.01); B60W 50/14 (2013.01);
(Continued)

(58) Field of Classification Search
CPC ........... B60W 30/18163; B60W 50/14; B60W 60/001; B60W 2050/146; B60W 2520/10; B60W 2520/12; B60W 2552/10; B60W 2720/106; B60W 2720/125; B60W 60/0015; B60W 2552/53; B60W 2554/802; B60W 40/105; B60K 35/00; B60K 2370/175; B60K 2370/52; B60K 2370/152; B60K 2370/168; B60K 2370/195;
(Continued)

(56) References Cited

U.S. PATENT DOCUMENTS

2019/0144004 A1   5/2019   Mimura et al.
2020/0331476 A1*  10/2020  Chen .................... G05D 1/0088
(Continued)

FOREIGN PATENT DOCUMENTS

CN   109760676 A   5/2019
CN   111771234 A   10/2020
(Continued)

Primary Examiner — Peter D Nolan
Assistant Examiner — Ashley L Redhead, Jr.
(74) Attorney, Agent, or Firm — Dickinson Wright, PLLC

(57) ABSTRACT

The automated driving system includes a vehicle speed detection device for detecting a speed of a vehicle, a display device capable of displaying a running lane and an adjacent lane of the vehicle, and a processor configured to control display content of the display device, and execute an autonomous lane change of the vehicle. The processor is configured to prohibit the autonomous lane change of the vehicle when a speed of the vehicle is less than a predetermined value. The processor is configured to hide the adjacent lane when the autonomous lane change is prohibited and start displaying the adjacent lane before the speed of the vehicle reaches the predetermined value if it is planned for the vehicle to accelerate from a speed below the predetermined value to a speed equal to or greater than the predetermined value in order to carry out the autonomous lane change.

4 Claims, 7 Drawing Sheets

(51) Int. Cl.
*B60W 50/14* (2020.01)
*G06F 3/14* (2006.01)
*B60W 60/00* (2020.01)

(52) U.S. Cl.
CPC .............. *B60W 60/001* (2020.02); *G06F 3/14* (2013.01); *B60K 2370/175* (2019.05); *B60K 2370/52* (2019.05); *B60W 2050/146* (2013.01); *B60W 2520/10* (2013.01); *B60W 2520/12* (2013.01); *B60W 2552/10* (2020.02); *B60W 2720/106* (2013.01); *B60W 2720/125* (2013.01)

(58) Field of Classification Search
CPC ........ B60K 2370/197; B60K 2370/167; G06F 3/14; G09G 3/20; G09G 2354/00; G09G 2380/10
See application file for complete search history.

(56) References Cited

U.S. PATENT DOCUMENTS

| | | |
|---|---|---|
| 2020/0398849 A1 | 12/2020 | Kanoh |
| 2021/0155243 A1* | 5/2021 | Taniguchi ............. B60W 40/04 |
| 2022/0171590 A1 | 6/2022 | Seitz et al. |
| 2022/0203992 A1* | 6/2022 | Taniguchi .............. G08G 1/167 |
| 2023/0294701 A1* | 9/2023 | Kato ..................... B60W 50/10 |
| | | 701/26 |

FOREIGN PATENT DOCUMENTS

| | | |
|---|---|---|
| DE | 102010049721 A1 | 4/2012 |
| JP | 2017187982 A | 10/2017 |
| JP | 2019090627 A | 6/2019 |
| WO | 2019163121 A1 | 8/2019 |
| WO | 2020173775 A1 | 9/2020 |

* cited by examiner

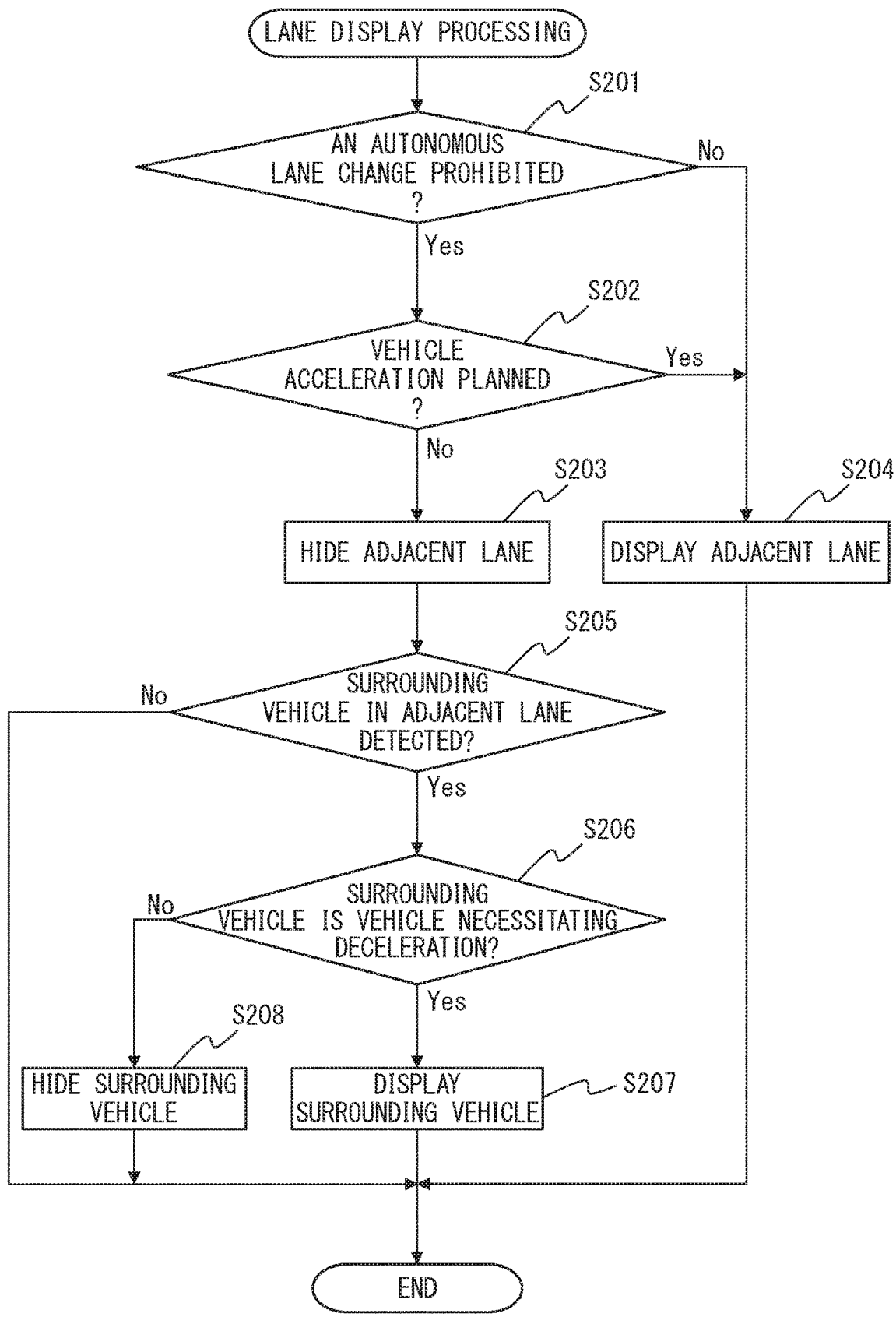

AUTOMATED DRIVING SYSTEM

FIELD

The present disclosure relates to an automated driving system.

BACKGROUND

It has been known in the past to provide information on the surroundings to a driver of a vehicle capable of autonomous driving by displaying surrounding vehicles detected by a vehicle detection device mounted in the vehicle etc. on a display device inside the vehicle (for example, PTL 1).

CITATIONS LIST

Patent Literature

[PTL 1] Japanese Unexamined Patent Publication No. 2017-187982

Technical Problem

In this regard, in vehicles capable of autonomous driving that have been developed in recent years, an autonomous lane change is often permitted only under predetermined conditions. For example, an autonomous lane change is permitted when the speed of the vehicle is equal to or greater than a predetermined value and is prohibited when the speed of the vehicle is less than the predetermined value.

Therefore, it is desirable that the driver be able to view the permissibility of an autonomous lane change while the vehicle is running. For example, it is conceivable to display an adjacent lane on a display device when an autonomous lane change is permitted and to hide the adjacent lane on the display device when an autonomous lane change is prohibited.

However, if the adjacent lane is always hidden when an autonomous lane change is prohibited, the adjacent lane will be hidden until the speed of the vehicle reaches a predetermined value even if acceleration of the vehicle to change lanes is planned. As a result, the timing by which the result of recognition of the destination lane of the lane change by the system is conveyed to the driver is liable to be delayed.

In consideration of the above problem, an object of the present disclosure is to communicate the permissibility of an autonomous lane change to a driver in an appropriate manner.

Solution to Problem

The summary of the present disclosure is as follows.

(1) An automated driving system comprising: a vehicle speed detection device for detecting a speed of a vehicle; a display device capable of displaying a running lane and an adjacent lane of the vehicle; and a processor configured to control display content of the display device, and execute an autonomous lane change of the vehicle, wherein the processor is configured to prohibit the autonomous lane change of the vehicle when a speed of the vehicle is less than a predetermined value, and the processor is configured to hide the adjacent lane when the autonomous lane change is prohibited and start displaying the adjacent lane before the speed of the vehicle reaches the predetermined value if it is planned for the vehicle to accelerate from a speed below the predetermined value to a speed equal to or greater than the predetermined value in order to carry out the autonomous lane change.

(2) The automated driving system described in above (1), wherein the processor is configured to start displaying a destination lane of a lane change among adjacent lanes before the speed of the vehicle reaches the predetermined value if it is planned for the vehicle to accelerate from a speed below the predetermined value to a speed equal to or greater than the predetermined value in order to carry out the autonomous lane change.

(3) The automated driving system described in above (1) or (2), wherein the processor is configured to display only the running lane and a destination lane of a lane change when the autonomous lane change is executed if there are adjacent lanes on both sides of the running lane.

(4) The automated driving system described in any one of above (1) to (3), further comprising a vehicle detection device for detecting surrounding vehicles present around the vehicle, wherein the processor is configured to set a vehicle necessitating deceleration among the surrounding vehicles detected by the vehicle detection device, control acceleration and deceleration of the vehicle so that the vehicle does not approach the vehicle necessitating deceleration, and display the vehicle necessitating deceleration when a surrounding vehicle in an adjacent lane not displayed on the display device is set as the vehicle necessitating deceleration.

According to the present disclosure, it is possible to communicate the permissibility of an autonomous lane change to a driver in an appropriate manner.

BRIEF DESCRIPTION OF DRAWINGS

FIG. 10 is a flow chart showing a control routine for lane display processing in the second embodiment.

DESCRIPTION OF EMBODIMENTS

Figure 1:
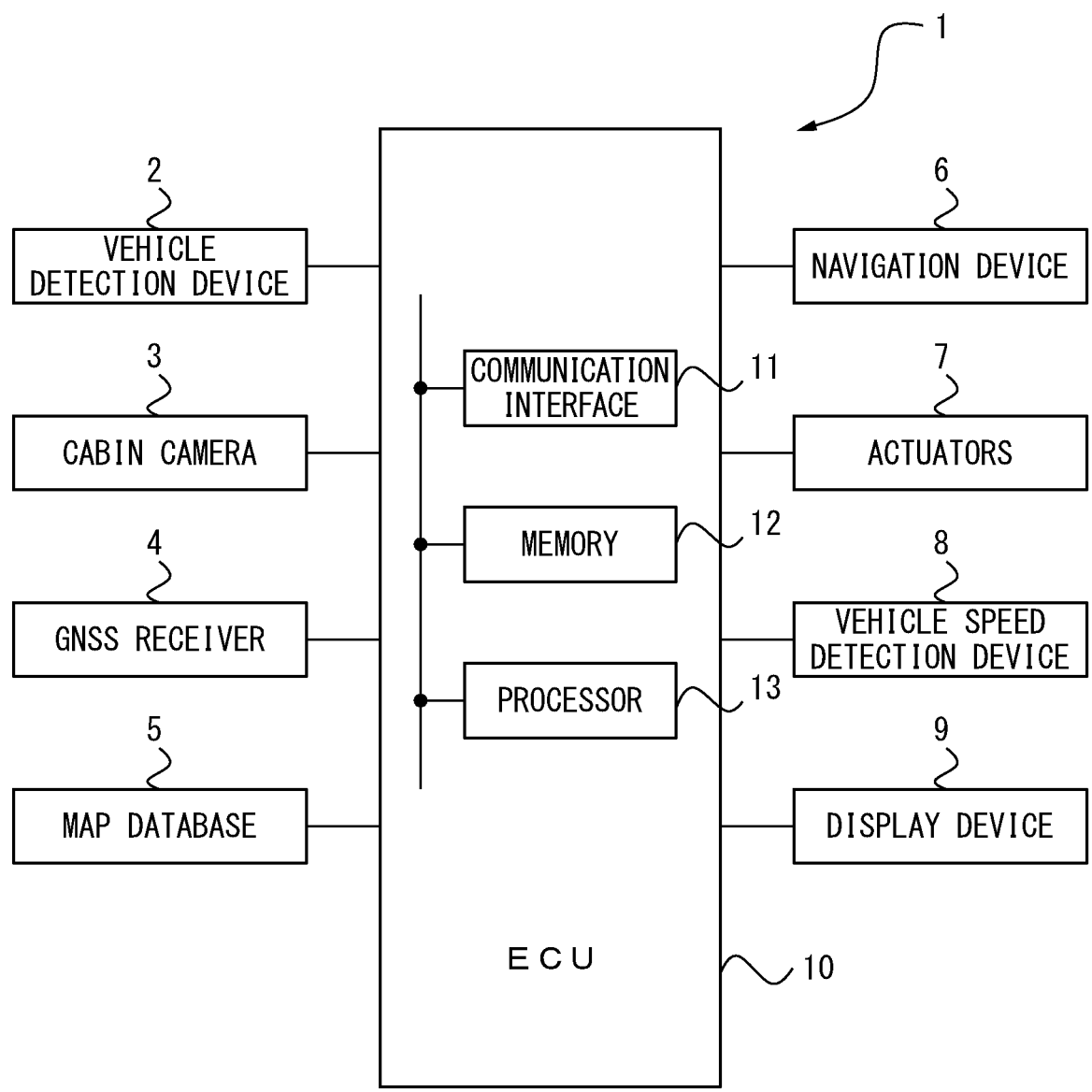
FIG. 1 is a view schematically showing the configuration of an automated driving system according to a first embodiment of the present disclosure.

Below, referring to the drawings, embodiments of the present disclosure will be explained in detail. Note that, in the following explanation, similar component elements will be assigned the same reference notations.

First Embodiment

First, referring to FIG. 1 to FIG. 7, a first embodiment of the present disclosure will be explained.

<Configuration of Autonomous Driving System>

FIG. 1 is a view schematically showing the configuration of an autonomous driving system 1 according to the first embodiment of the present disclosure. The autonomous driving system 1 is mounted in a vehicle and performs autonomous driving of the vehicle. In autonomous driving of a vehicle, a part or all of acceleration, steering, and braking of the vehicle are performed automatically. That is, a vehicle in which the autonomous driving system 1 is mounted is a vehicle having driving assist functions or an autonomous driving vehicle which can automatically perform all of acceleration, steering, and braking of the vehicle.

As shown in FIG. 1, the autonomous driving system 1 is provided with a vehicle detection device 2, a cabin camera 3, a GNSS receiver 4, a map database 5, a navigation device 6, actuators 7, a vehicle speed detection device 8, a display device 9, and an electronic control unit (ECU) 10. The vehicle detection device 2, the cabin camera 3, the GNSS receiver 4, the map database 5, the navigation device 6, the actuators 7, the vehicle speed detection device 8, and the display device 9 are provided in the vehicle and are connected through an internal vehicle network based on the CAN (Controller Area Network) or other standards to be able to communicate with the ECU 10.

The vehicle detection device 2 detects surrounding vehicles present in the surroundings of the vehicle (host vehicle). Specifically, the vehicle detection device 2 detects presence or absence of a surrounding vehicle around the vehicle, the distance of the surrounding vehicle to the vehicle, and the relative speed between the vehicle and the surrounding vehicle. The output of the vehicle detection device 2 is transmitted to the ECU 10. In the present embodiment, the vehicle detection device 2 is constituted by an external camera, a LIDAR (laser imaging detection and ranging device), a milliwave radar, an ultrasonic sensor (sonar), or any combination of the same.

Figure 2:
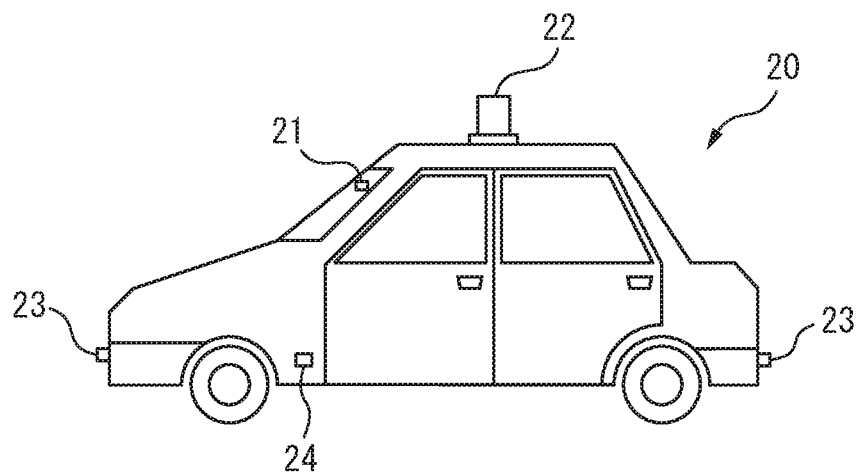
FIG. 2 is a view schematically showing a part of the configuration of a vehicle in which the automated driving system according to the first embodiment of the present disclosure is mounted.

FIG. 2 is a view schematically showing a part of the configuration of a vehicle 20 in which an autonomous driving system 1 according to the first embodiment of the present disclosure is mounted. As shown in FIG. 2, the vehicle 20 is provided with a vehicle-mounted camera 21, a LIDAR 22, a milliwave radar 23 and an ultrasonic sensor (sonar) 24.

The vehicle-mounted camera 21 captures the surroundings of the vehicle 20 and generates images of the surroundings of the vehicle 20. In the present embodiment, the vehicle-mounted camera 21 is arranged at the front of the vehicle 20 (for example, the back surface of the room mirror inside the vehicle, the front bumper, etc.) so as to capture the front region of the vehicle 20. Note that the vehicle-mounted camera 21 may be a stereo camera able to measure distance.

The LIDAR 22 emits laser beams to the surroundings of the vehicle 20 and receives reflections of the laser beams. Due to this, the LIDAR 22 can detect the presence of any object in the surroundings of the vehicle 20, the distance from the vehicle 20 to the object, and the relative speed of the vehicle 20 and the object. In the present embodiment, the LIDAR 22 is provided at the top part of the vehicle 20, specifically on the roof of the vehicle 20.

The milliwave radar 23 emits milliwaves to the surroundings of the vehicle 20 and receives reflections of the milliwaves. Due to this, the milliwave radar 23 can detect the presence of any object in the surroundings of the vehicle 20, the distance from the vehicle 20 to the object, and the relative speed of the vehicle 20 and the object. In the present embodiment, milliwave devices 23 are provided at the front part and the rear part of the vehicle 20 (for example, the front bumper and the rear bumper of the vehicle 20).

The ultrasonic sensor 24 emits ultrasonic waves to the surroundings of the vehicle 20 and receives reflections of the ultrasonic waves. Due to this, the ultrasonic sensor 24 can detect the presence of any object in the surroundings of the vehicle 20, the distance from the vehicle 20 to the object, and the relative speed of the vehicle 20 and the object. In the present embodiment, ultrasonic sensors 24 are provided at the both side parts of the vehicle (for example, the left and right front bumpers of the vehicle 20).

Note that the positions and numbers of the vehicle-mounted camera 21, the LIDAR 22, the milliwave radar 23, and the ultrasonic sensor 24 are not limited to the above. Further, some of these may be omitted.

The cabin camera 3 has a camera and a projector and captures the face of the driver of the vehicle 20 to generate a facial image of the driver. The camera is constituted by a lens and an imaging element and is, for example, a CMOS (complementary metal oxide semiconductor) camera or CCD (charged coupled device) camera. The projector includes LEDs (light-emitting diodes), for example, two near-infrared LEDs arranged at the both sides of the camera. The cabin camera 3 is also referred to as a driver monitor camera. The output of the cabin camera 3 is transmitted to the ECU 10.

The GNSS receiver 4 captures a plurality of positioning satellites and receives radio waves transmitted from the positioning satellites. The GNSS receiver 4 calculates the distances to the positioning satellites based on the difference between the time of transmission and time of reception of the radio waves and detects the current position of the vehicle 20 (for example, the longitude and latitude of the vehicle 20) based on the distances to the positioning satellites and the positions of the positioning satellites (orbit information). The output of the GNSS receiver 4 is transmitted to the ECU 10. Note that "GNSS (global navigation satellite system)" is a general term for the United States' GPS, Russia's GLONASS, Europe's Galileo, Japan's QZSS, China's BeiDou, and India's IRNSS, and other satellite positioning systems. Therefore, the GNSS receiver 4 includes a GPS receiver.

The map database 5 stores map information. The map information stored in the map database 5 is updated using communication with the outside of the vehicle 20, SLAM (simultaneous localization and mapping), etc. The ECU10 acquires map information from the map database 5.

The navigation device 6 sets a driving route of the vehicle 20 to a destination based on the current position of the vehicle 20 detected by the GNSS receiver 4, the map information of the map database 5, inputs by the driver, etc. The driving route set by the navigation device 6 is transmitted to the ECU 10. Note that the GNSS receiver 4 and map database 5 may be built into the navigation device 6.

The actuators 7 make the vehicle 20 operate. For example, the actuators 7 include drive devices for accelerating the vehicle 20 (at least one of an engine and a motor), a brake actuator for braking the vehicle 20, a steering motor for steering the vehicle 20, etc. The ECU 10 controls the actuators 7 for the purpose of autonomous driving of the vehicle 20.

The vehicle speed detection device 8 detects the speed of the vehicle. The vehicle speed detection device 8 detects the speed of the vehicle by detecting, for example, the rotational speed of the wheels of the vehicle. The output of the vehicle speed detection device 8 is transmitted to the ECU 10.

The display device 9 has a display for displaying text, images, and other digital information and presents various information to the driver of the vehicle 20. The display device 9 is provided at the inside of the vehicle so as to be able to be seen by the driver of the vehicle 20. The display device 9 is a human-machine interface (HMI) comprised of at least one of, for example, a touch screen, a heads up display, a digital instrumentation panel, etc. Note that, the display device 9 may be provided with a speaker for generating voice and other audio, operating buttons for a driver to perform input operations, a microphone receiving voice information from the driver, etc.

The ECU 10 performs various controls of the vehicle. As shown in FIG. 1, the ECU 10 is provided with a communication interface 11, a memory 12, and a processor 13. The communication interface 11 and the memory 12 are connected to the processor 13 through signal lines. Note that, in the present embodiment, a single ECU 10 is provided, but a plurality of ECUs may be provided for the respective functions.

The communication interface 11 has an interface circuit for connecting the ECU 10 to an internal vehicle network. The ECU 10 communicates with the vehicle detection device 2, the cabin camera 3, the GNSS receiver 4, the map database 5, the navigation device 6, the actuators 7, the vehicle speed detection device 8, and the display device 9 through the communication interface 11.

The memory 12, for example, has a volatile semiconductor memory and a nonvolatile semiconductor memory. The memory 12 stores programs, data, etc., used when various types of processing are performed by the processor 13.

The processor 13 has one or more CPUs (central processing units) and their peripheral circuits. Note that, the processor 13 may further have a processing circuit such as a logic processing unit or a numerical processing unit.

Figure 3:
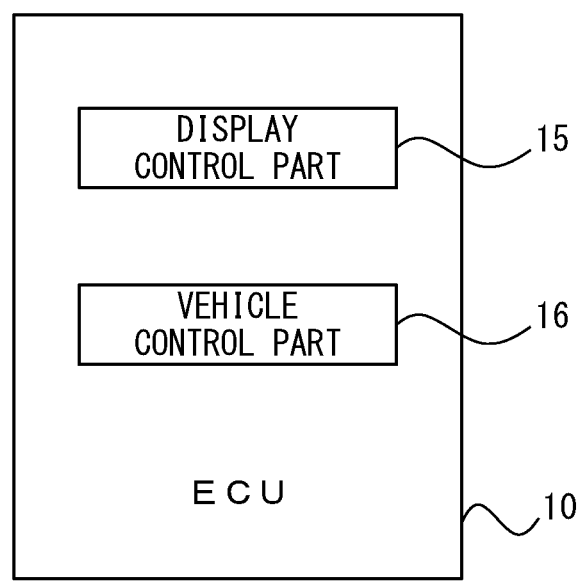
FIG. 3 is a functional block diagram of an ECU in the first embodiment.

FIG. 3 is a functional block diagram of the ECU 10 in the first embodiment. In the present embodiment, the ECU 10 has a display control part 15 and a vehicle control part 16. The display control part 15 and the vehicle control part 16 are functional modules realized by programs stored in the memory 12 of the ECU 10 run by the processor 13 of the ECU 10.

The display control part 15 controls the display content of the display device 9. In the present embodiment, the display device 9 displays a running lane and an adjacent lane of the vehicle 20 along with the vehicle 20 and surrounding vehicles around the vehicle 20. The surrounding vehicles around the vehicle 20 are detected by the vehicle detection device 2. The shape of the driving lane of the vehicle 20 and the shape and number of adjacent lanes are identified from the map information stored in the map database 5. That is, the display control part 15 acquires map information corresponding to the current location of the vehicle 20 identified based on the output of GNSS receiver 4, etc. from the map database 5. Note that the driving lane and adjacent lanes of the vehicle 20 may be detected by the vehicle detection device 2.

Figure 4:
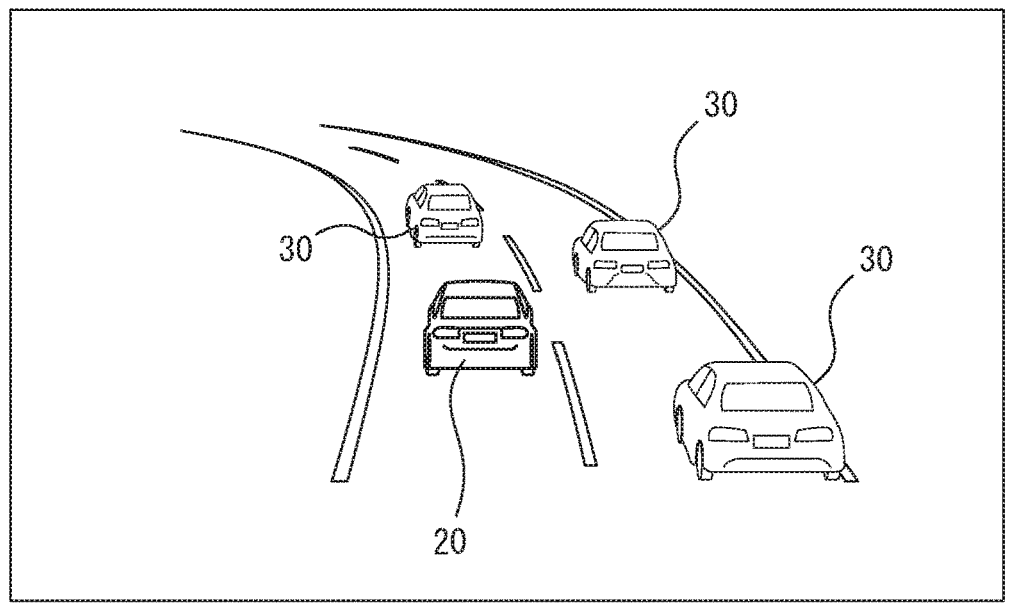
FIG. 4 is a view showing one example of an image displayed on a display device.

FIG. 4 is a view showing one example of an image displayed by the display device 9. As shown in FIG. 4, the display device 9 displays the vehicle 20 (host vehicle) and surrounding vehicles 30 as vehicle icons, respectively. In the present embodiment, the sizes and shapes of the vehicle icons are determined in advance.

As shown in FIG. 4, the display device 9 displays an image when seen from the rear of the vehicle 20 at a higher position than the vehicle 20. The driver of the vehicle 20 can view this display to thereby obtain a grasp of the detected state of the surrounding vehicles 30 around the vehicle 20.

The vehicle control part 16 controls the vehicle 20 to execute autonomous driving of the vehicle 20. For example, the vehicle control part 16 uses the actuators 7 to control steering, acceleration, and deceleration of the vehicle 20 to thereby execute an autonomous lane change of the vehicle 20. At this time, the vehicle control part 16 executes a lane change of the vehicle 20 so as to avoid collision with surrounding vehicles detected by the vehicle detection device 2.

However, when the speed of the vehicle 20 is low, the relative speed of a surrounding vehicle with the vehicle 20 becomes higher in comparison to when the speed of the vehicle 20 is high. As a result, a surrounding vehicle further at the rear is liable to approach the vehicle 20 at the time of a lane change. That is, when the speed of the vehicle 20 is low, the rearward area to be monitored for a lane change becomes larger in comparison to when the speed of the vehicle 20 is high.

Therefore, in the present embodiment, the vehicle control part 16 permits an autonomous lane change of the vehicle 20 when the speed of the vehicle 20 is equal to or greater than a predetermined value and prohibits an autonomous lane change of the vehicle 20 when the speed of the vehicle 20 is less than the predetermined value. Due to this, it is possible to reduce the burden of monitoring an adjacent lane.

When an autonomous lane change of the vehicle 20 is permitted, if a lane change is instructed by the driver through operation of a turn signal lever or the like, the autonomous lane change is executed under the starting condition that visual confirmation by the driver be detected based on for example the output of the cabin camera 3. On the other hand, when an autonomous lane change of the vehicle 20 is prohibited, an autonomous lane change will not be executed even if a lane change is instructed by the driver.

Therefore, it is desirable that the driver be able to view the permissibility of an autonomous lane change while the vehicle 20 is running. Thus, in the present embodiment, the display control part 15 displays an adjacent lane of the vehicle 20 when an autonomous lane change is permitted and hides the adjacent lane of the vehicle 20 when an autonomous lane change is prohibited. By doing this, it is possible for the driver to intuitively recognize, through the display on the display device 9, the permissibility of an autonomous lane change.

Figure 5:
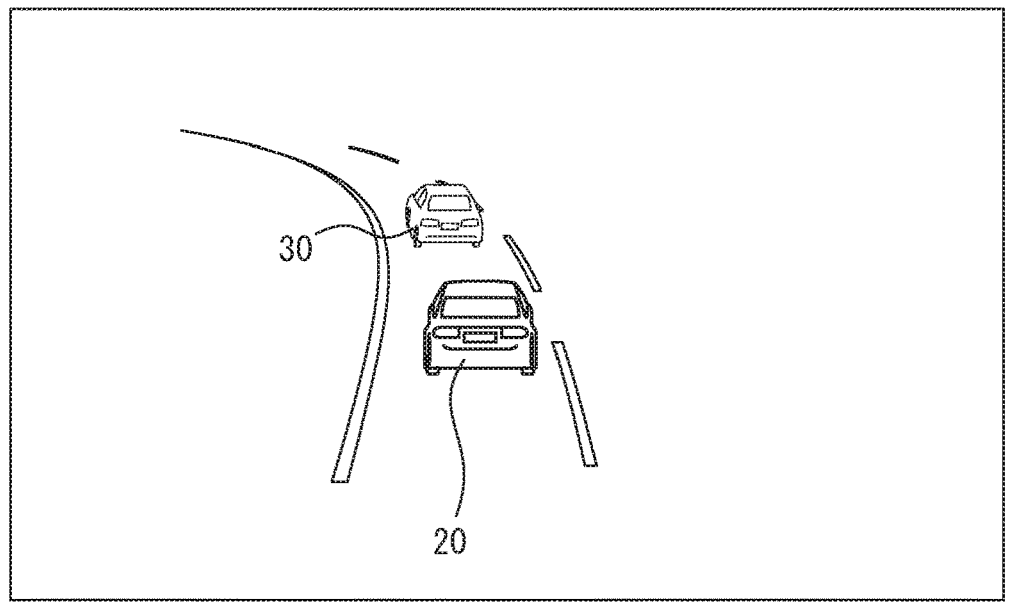
FIG. 5 is a view showing one example of an image displayed on the display device when a lane change of the vehicle is prohibited.

FIG. 5 is a view showing one example of an image displayed on the display device 9 when a lane change of the vehicle 20 is prohibited. In the image of FIG. 5, unlike the image of FIG. 4 which shows the actually detected situation, the adjacent lane and surrounding vehicles in the adjacent lane are hidden.

Further, in the present embodiment, if there are adjacent lanes on both sides of the vehicle 20, when an autonomous lane change of the vehicle 20 is executed, the display control part 15 displays only the running lane of the vehicle 20 and destination lane of the lane change. For example, when the vehicle 20 moves to the right side adjacent lane due to a lane change, only the running lane of the vehicle 20 and right side adjacent lane are displayed, while the left side adjacent lane is hidden. Due to this, the driver can easily recognize the direction of the lane change. Note that when an autonomous lane change of the vehicle 20 is executed, an arrow etc. indicating the direction of the lane change may be additionally displayed on the display device 9.

Further, in the present embodiment, the display control part 15 keeps displaying the adjacent lane while an autonomous lane change of the vehicle 20 is being executed regardless of the speed of the vehicle 20. In other words, the display control part 15 keeps displaying the adjacent lane until the lane change is finished or the lane change is interrupted even if the speed of the vehicle 20 falls below a predetermined value after the start of an autonomous lane change of the vehicle 20. Due to this, it is possible to keep the driver from feeling anxious with regard to control of a lane change and keep unnecessary manual operation from being performed during a lane change.

As explained above, when the speed of the vehicle 20 is less than a predetermined value, an autonomous lane change of the vehicle 20 is prohibited. For this reason, if an adjacent lane is constantly hidden when an autonomous lane change of the vehicle 20 is prohibited, the adjacent lanes will be hidden until the speed of the vehicle 20 reaches a predetermined value even if making the vehicle accelerate to change a lane is planned. As a result, the timing of conveying to the driver the result of recognition of the destination lane of the lane change by the system is liable to be delayed.

Therefore, in the present embodiment, the display control part 15 hides an adjacent lane when an autonomous lane change is prohibited, but starts displaying the adjacent lane before the speed of the vehicle 20 reaches the predetermined value if it is planned for the vehicle 20 to accelerate from a speed below the predetermined value to a speed equal to or greater than the predetermined value in order to carry out an autonomous lane change. By doing this, it is possible to convey the result of recognition of the destination lane of a lane change by the system to the driver in advance. Accordingly, according to the present embodiment, it is possible to convey the permissibility of an autonomous lane change to the driver in an appropriate manner.

In particular, in the present embodiment, if it is planned for the vehicle 20 to accelerate from a speed below the predetermined value to a speed equal to or greater than the predetermined value in order to carry out an autonomous lane change, the display control part 15 starts displaying the destination lane of a lane change among adjacent lanes before the speed of the vehicle 20 reaches the predetermined value. Due to this, even if there are a plurality of adjacent lanes, the driver will easily recognize the direction of the lane change.

Figure 6:
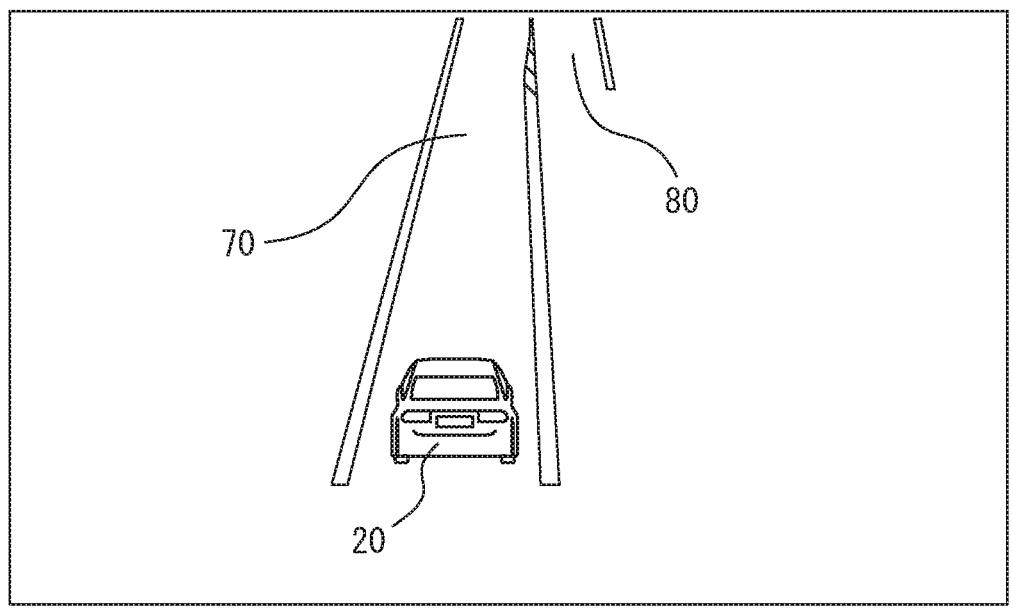
FIG. 6 is a view showing one example of an image at the time a destination lane of the lane change starts being displayed when the vehicle speed is less than a predetermined value.

FIG. 6 is a view showing one example of the image at the time the destination lane of the lane change starts being displayed when the speed of the vehicle 20 is less than a predetermined value. In the example of FIG. 6, it is planned for the vehicle 20 to accelerate in a passing lane 70 on an automobile only road so as to change a lane to the main lane 80 (merge), and the main lane 80 ahead is displayed before the speed of the vehicle 20 reaches the predetermined value.

<Lane Display Processing>

Figure 7:
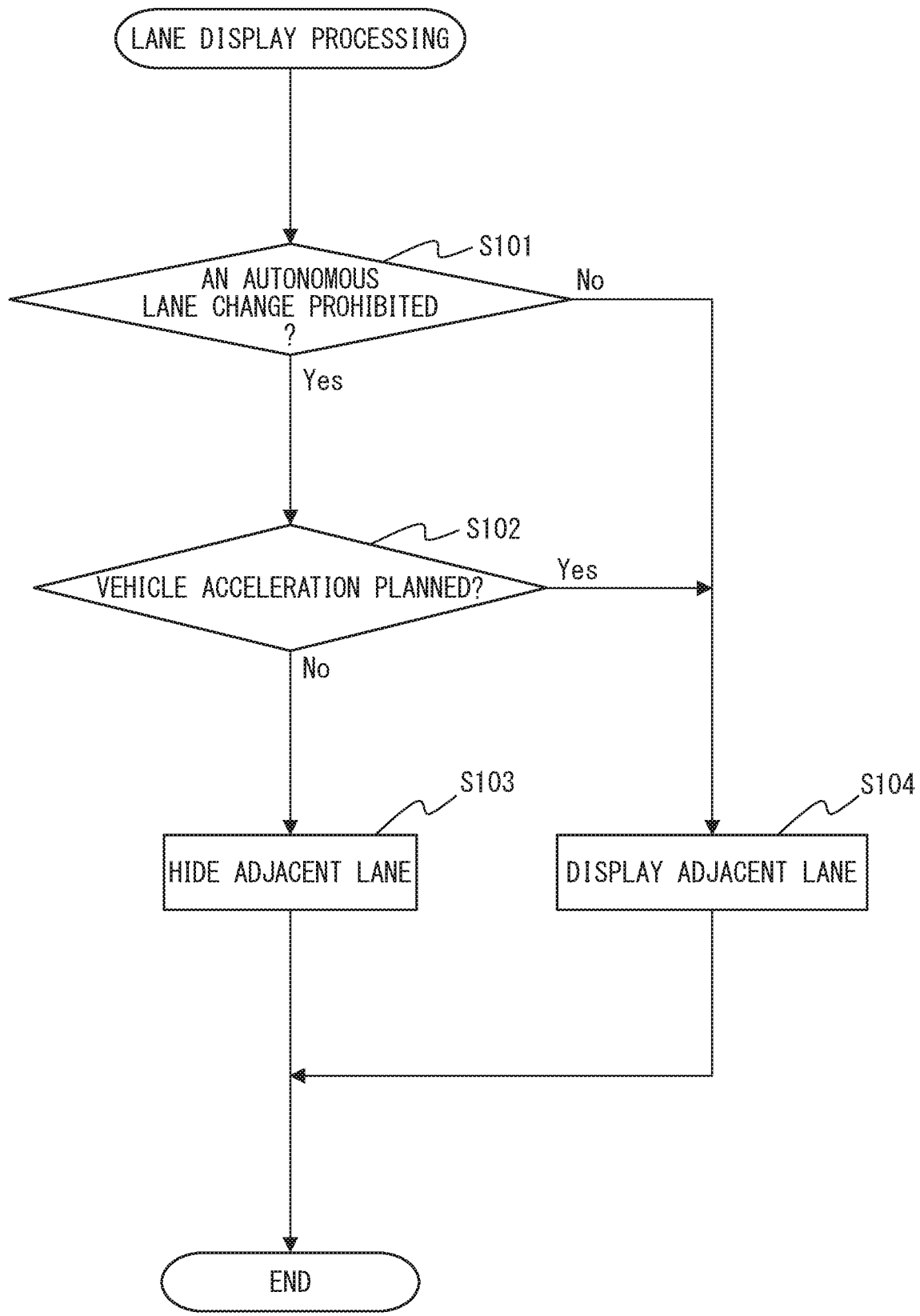
FIG. 7 is a flow chart showing a control routine for lane display processing in the first embodiment.

Below, the flow chart of FIG. 7 will be used to explain the above-explained control in detail. FIG. 7 is a flow chart showing a control routine for lane display processing in the first embodiment. The present control routine is repeatedly executed by the ECU 10 at predetermined intervals. The predetermined intervals are, for example, intervals at which the result of detection of surrounding vehicles by the vehicle detection device 2 are updated.

First, at step S101, the display control part 15 judges whether an autonomous lane change of the vehicle 20 is prohibited. If an autonomous lane change of the vehicle 20 is prohibited, that is, if the speed of the vehicle 20 detected by the vehicle speed detection device 8 is less than a predetermined value, the present control routine proceeds to step S102.

Next, at step S102, the display control part 15 judges whether it is planned for the vehicle 20 to accelerate from a speed below the predetermined value to a speed equal to or greater than the predetermined value in order to carry out an autonomous lane change. The predetermined value is determined in advance and is set, for example, in the range of 40 km/h to 70 km/h, preferably 50 km/h.

For example, when the vehicle 20 is present in a passing lane on an automobile only road for merging into the main lane, it is judged that it is planned for the vehicle 20 to accelerate from a speed below the predetermined value to a speed equal to or greater than the predetermined value in order to carry out an autonomous lane change. Note that, when the distance to the terminating end of the passing lane is equal to or less than a predetermined value or when the predicted required amount of time to arrive at the terminating end of the passing lane is equal to or less than a predetermined time, it may be judged that it is planned for the vehicle 20 to accelerate from a speed below the predetermined value to a speed equal to or greater than the predetermined value in order to carry out an autonomous lane change. Further, when overtaking a preceding vehicle by a lane change is added to the running plan, it may be judged that it is planned for the vehicle 20 to accelerate from a speed below the predetermined value to a speed equal to or greater than the predetermined value in order to carry out an autonomous lane change.

At step S102, if it is judged that it is not planned for the vehicle 20 to accelerate from a speed below the predetermined value to a speed equal to or greater than the predetermined value in order to carry out an autonomous lane change, the present control routine proceeds to step S103. At step S103, the display control part 15 hides the adjacent lane on the display device 9. Note that, if a plurality of adjacent lanes are present, all adjacent lanes are hidden and only the running lane of the vehicle 20 is displayed. Further, if a surrounding vehicle is detected in an adjacent lane, not only the adjacent lane but also the surrounding vehicle in the adjacent lane is hidden. After step S103, the present control routine ends.

On the other hand, if at step S101 an autonomous lane change of the vehicle 20 is permitted or if at step S102 it is judged that it is planned for the vehicle 20 to accelerate from a speed below the predetermined value to a speed equal to or greater than the predetermined value in order to carry out an autonomous lane change, the present control routine proceeds to step S104. At step S104, the display control part 15 displays the adjacent lane on the display device 9. Note that if a surrounding vehicle is detected on the adjacent lane, not only the adjacent lane but the surrounding vehicle on the adjacent lane is displayed as well. After step S104, the present control routine ends.

Second Embodiment

An automated driving system according to a second embodiment is essentially similar to the automated driving system according to the first embodiment in configuration and control except for the points explained below. For this reason, the parts of the second embodiment of the present disclosure different from the first embodiment will be focused on in the explanation below.

Figure 8:
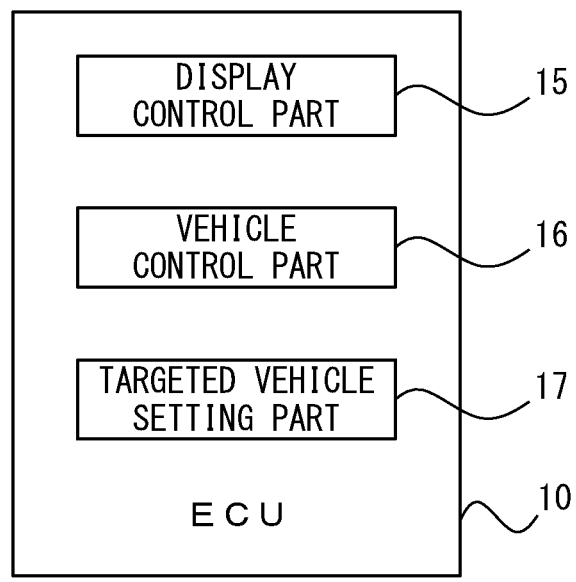
FIG. 8 is a functional block diagram of the ECU in a second embodiment.

FIG. 8 is a functional block diagram of the ECU 10 in the second embodiment. In the second embodiment, the ECU 10 has a targeted vehicle setting part 17, in addition to the display control part 15 and the vehicle control part 16. The display control part 15, the vehicle control part 16, and the targeted vehicle setting part 17 are functional modules realized by the processor 13 of the ECU 10 running a program stored in the memory 12 of the ECU 10.

The targeted vehicle setting part 17 sets a vehicle necessitating deceleration from among surrounding vehicles detected by the vehicle detection device 2. Note that "vehicle necessitating deceleration" in the description means a surrounding vehicle restricting the speed of the vehicle 20 (host vehicle) due to its behavior.

First, the targeted vehicle setting part 17 sets a preceding vehicle in the running lane of the vehicle 20 and a surrounding vehicle in an adjacent lane likely to enter the running lane in front of the vehicle 20 as candidates necessitating deceleration. At this time, whether the surrounding vehicle in the adjacent lane is likely to enter the running lane in front of the vehicle 20 is judged based on, for example, the lateral speed of the surrounding vehicle. In this case, when, for example, the lateral speed of the surrounding vehicle in the direction of approach of the surrounding vehicle to the running lane of the vehicle 20 is equal to or greater than a predetermined value, it is judged that the surrounding vehicle in the adjacent lane is likely to enter the running lane in front of the vehicle 20. Further, if an obstacle (fallen object, broken down vehicle, construction site, etc.) is detected in front of the surrounding vehicle in the adjacent lane based on the output of the vehicle detection device 2, etc., it is judged that the surrounding vehicle in the adjacent lane is likely to enter the running lane in front of the vehicle 20. Further, when a lane reduction will occur such that the adjacent lane will disappear and the running lane of the vehicle 20 will become a merged lane, it is judged that the surrounding vehicle in the adjacent lane is likely to enter the running lane in front of the vehicle 20.

Next, the targeted vehicle setting part 17 sets a vehicle necessitating deceleration among the candidates necessitating deceleration based on a predetermined condition. For example, the targeted vehicle setting part 17 uses a map, etc. to judge whether a candidate necessitating deceleration meets the requirement of being a vehicle necessitating deceleration based on the distance between the vehicle 20 and candidate necessitating deceleration and the relative speed between the vehicle 20 and the candidate necessitating deceleration. Further, when the running lane of the vehicle 20 will become a merged lane, the targeted vehicle setting part 17 uses a set requirement that the distance between the vehicle 20 and the candidate necessitating deceleration in the adjacent lane be equal to or greater than a predetermined distance at a predetermined location before the merger to judge whether the candidate necessitating deceleration in the adjacent lane meets the requirement of being a vehicle necessitating deceleration. Note that, when a plurality of candidates necessitating deceleration meet the requirement of being a vehicle necessitating deceleration, the candidate necessitating deceleration that requires the greatest amount of restriction to the speed of the vehicle 20 (for example, the degree of deceleration of the vehicle 20) is set as the vehicle necessitating deceleration. Further, if there is no surrounding vehicle meeting the requirement of being a vehicle necessitating deceleration, no vehicle necessitating deceleration is set.

When a vehicle necessitating deceleration is set by the targeted vehicle setting part 17, the vehicle control part 16 controls acceleration and deceleration of the vehicle 20 so that the vehicle 20 does not approach the vehicle necessitating deceleration. Specifically, the vehicle control part 16 causes the vehicle 20 to decelerate or suppresses acceleration of the vehicle 20 to a target speed so that the vehicle 20 does not approach the vehicle necessitating deceleration.

As explained above, the display control part 15 hides adjacent lanes and surrounding vehicles on the adjacent lanes when an autonomous lane change of the vehicle 20 is prohibited. However, when a surrounding vehicle on an adjacent lane is set as a vehicle necessitating deceleration, it is desirable to notify the driver of the presence of the vehicle necessitating deceleration.

Therefore, in the second embodiment, when a surrounding vehicle in an adjacent lane not displayed on the display device 9 is set as a vehicle necessitating deceleration, the display control part 15 displays the vehicle necessitating deceleration. As a result, it is possible to suggest the permissibility of an autonomous lane change to the driver while allowing the driver to understand why the vehicle 20 is decelerating in the event that the vehicle 20 does decelerate.

Figure 9:
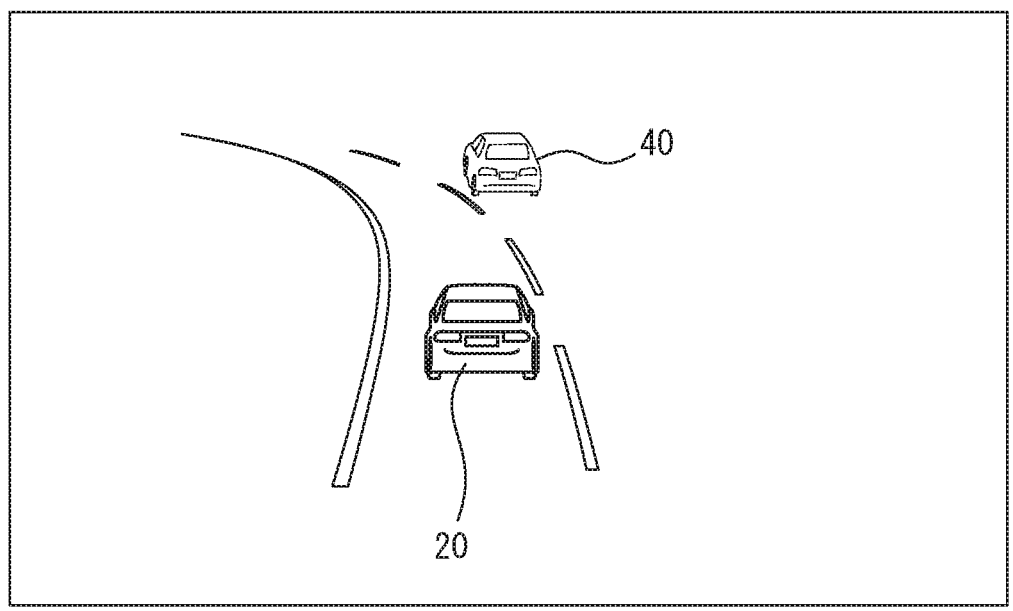
FIG. 9 is a view showing one example of an image displayed on the display device when a surrounding vehicle in an adjacent lane that is not displayed is set as a vehicle necessitating deceleration.

FIG. 9 is a view showing one example of an image being displayed on the display device 9 when a surrounding vehicle in an adjacent lane that is not displayed is set as a vehicle necessitating deceleration. In the image of FIG. 9, an adjacent lane adjacent to the running lane of the vehicle 20 is hidden and only the vehicle necessitating deceleration 40 in the adjacent lane is displayed.

<Lane Display Processing>

FIG. 10 is a flow chart showing a control routine for lane display processing in the second embodiment. The present control routine is repeatedly executed by the ECU 10 at predetermined intervals. The predetermined intervals are, for example, intervals at which the result of detection of surrounding vehicles by the vehicle detection device 2 is updated.

Since steps S201 to S204 are similar to steps S101 to S104 of FIG. 7, the explanations thereof are omitted. After the adjacent lanes are hidden at step S203, the present control routine proceeds to step S205.

At step S205, the display control part 15 judges whether a surrounding vehicle is detected in an adjacent lane by the vehicle detection device 2. If it is judged that no surrounding vehicle is detected in an adjacent lane, the present control routine ends. On the other hand, if it is judged that a surrounding vehicle is detected in an adjacent lane, the present control routine proceeds to step S206.

At step S206, the display control part 15 judges whether the surrounding vehicle in the adjacent lane is set as a vehicle necessitating deceleration. If it is judged that the surrounding vehicle in the adjacent lane is set as a vehicle necessitating deceleration, the present control routine proceeds to step S207.

At step S207, the display control part 15 displays the surrounding vehicle in the adjacent lane that is set as a vehicle necessitating deceleration. After step S207, the present control routine ends.

On the other hand, if at step S206 it is judged that the surrounding vehicle in the adjacent lane is not set as a vehicle necessitating deceleration, the present control routine proceeds to step S208. At step S208, the display control part 15 hides the surrounding vehicle in the adjacent lane. After step S208, the present control routine ends.

Above, preferred embodiments according to the present disclosure were explained, but the present disclosure is not limited to these embodiments. Various corrections and changes can be made within the language of the claims.

For example, the display device 9 of the autonomous driving system 1 may be provided on a server at the outside of the vehicle 20, in addition to the vehicle 20 or instead of the vehicle 20, so that an operator (a remote operator) can remotely control the autonomous driving of the vehicle 20. In this case, the output of the vehicle detection device 2 and the vehicle speed detection device 8, etc. is transmitted from the vehicle 20 to the server, and the processor of the server may function as the display control part.

Further, a plurality of types of vehicle icons may be used as the vehicle icon showing a surrounding vehicle. For example, the surrounding vehicle detected by the vehicle detection device 2 may be differentiated as a passenger car or a truck, and as the vehicle icon showing a surrounding vehicle, a vehicle icon for a passenger car and a vehicle icon for a truck may be used.

REFERENCE SIGNS LIST

1: automated driving system
8: vehicle speed detection device
9: display device
10: electronic control unit (ECU)
15: display control part
16: vehicle control part
20: vehicle

The invention claimed is:

1. An automated driving system comprising:
a vehicle speed detection device for detecting a speed of a vehicle;
a display device capable of displaying a running lane and an adjacent lane of the vehicle; and
a processor configured to control display content of the display device, and execute an autonomous lane change of the vehicle, wherein
the processor is configured to prohibit the autonomous lane change of the vehicle when a speed of the vehicle is less than a predetermined value, and
the processor is configured to hide the adjacent lane when the autonomous lane change is prohibited and start displaying the adjacent lane before the speed of the vehicle reaches the predetermined value if it is planned for the vehicle to accelerate from a speed below the predetermined value to a speed equal to or greater than the predetermined value in order to carry out the autonomous lane change.

2. The automated driving system according to claim 1, wherein the processor is configured to start displaying a destination lane of a lane change among adjacent lanes before the speed of the vehicle reaches the predetermined value if it is planned for the vehicle to accelerate from a speed below the predetermined value to a speed equal to or greater than the predetermined value in order to carry out the autonomous lane change.

3. The automated driving system according to claim 1, wherein the processor is configured to display only the running lane and a destination lane of a lane change when the autonomous lane change is executed if there are adjacent lanes on both sides of the running lane.

4. The automated driving system according to claim 1, further comprising a vehicle detection device for detecting surrounding vehicles present around the vehicle, wherein
the processor is configured to set a vehicle necessitating deceleration among the surrounding vehicles detected by the vehicle detection device, control acceleration and deceleration of the vehicle so that the vehicle does not approach the vehicle necessitating deceleration, and display the vehicle necessitating deceleration when a surrounding vehicle in an adjacent lane not displayed on the display device is set as the vehicle necessitating deceleration.

* * * * *